(12) United States Patent
Zhu et al.

(10) Patent No.: US 10,994,931 B2
(45) Date of Patent: May 4, 2021

(54) STOCK SHELF MANAGEMENT METHOD AND DEVICE

(71) Applicant: HANGZHOU HIKROBOT TECHNOLOGY CO., LTD, Hangzhou (CN)

(72) Inventors: Keping Zhu, Hangzhou (CN); Xiangliang Kong, Hangzhou (CN); Linwei Peng, Hangzhou (CN)

(73) Assignee: HANGZHOU HIKROBOT TECHNOLOGY CO., LTD, Hangzhou (CN)

( * ) Notice: Subject to any disclaimer, the term of this patent is extended or adjusted under 35 U.S.C. 154(b) by 180 days.

(21) Appl. No.: 16/465,069

(22) PCT Filed: Aug. 11, 2017

(86) PCT No.: PCT/CN2017/097165
§ 371 (c)(1),
(2) Date: May 29, 2019

(87) PCT Pub. No.: WO2018/099133
PCT Pub. Date: Jun. 7, 2018

(65) Prior Publication Data
US 2019/0291952 A1    Sep. 26, 2019

(30) Foreign Application Priority Data

Nov. 30, 2016 (CN) .......................... 201611078540.7

(51) Int. Cl.
*G06F 7/00* (2006.01)
*B65G 1/06* (2006.01)
(Continued)

(52) U.S. Cl.
CPC ................. *B65G 1/06* (2013.01); *B65G 1/10* (2013.01); *B65G 1/137* (2013.01); *B65G 1/1373* (2013.01);
(Continued)

(58) Field of Classification Search
CPC . B65G 1/06; B65G 1/137; B65G 1/10; B65G 1/1373; G06Q 10/08; G06Q 10/087; G06Q 50/28
(Continued)

(56) References Cited

U.S. PATENT DOCUMENTS 5,860,784 A * 1/1999 Schuitema ........... B65G 1/0407
414/280
6,377,867 B1 * 4/2002 Bradley ............... B65G 1/1376
700/216
(Continued)

FOREIGN PATENT DOCUMENTS

CN    1106356    8/1995
CN    101152922   4/2008
(Continued)

OTHER PUBLICATIONS

Office Action issued in Corresponding Japanese Application No. 2019-548506, dated Aug. 4, 2020 (English Translation provided).
(Continued)

*Primary Examiner* — Yolanda R Cumbess
(74) *Attorney, Agent, or Firm* — Norton Rose Fulbright US LLP (57) ABSTRACT

A shelf management method and device are provided. The method comprises: controlling a conveying means to convey a first shelf to a workbench in a warehouse, the first shelf being a shelf in the warehouse; controlling, if the first shelf is one of high-frequency shelves, the conveying means to convey the first shelf to a first storage position in the
(Continued)

warehouse, wherein the high-frequency shelves comprise a preset number of shelves subject to the highest numbers of deliveries in the warehouse; and controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench. Efficiency of delivery can be improved.

14 Claims, 6 Drawing Sheets

(51) Int. Cl.
  *B65G 1/10* (2006.01)
  *B65G 1/137* (2006.01)
  *G06Q 10/08* (2012.01)
  *G06Q 50/28* (2012.01)
(52) U.S. Cl.
  CPC ........... *G06Q 10/08* (2013.01); *G06Q 10/087* (2013.01); *G06Q 50/28* (2013.01)
(58) Field of Classification Search
  USPC .................... 700/213–216, 223, 228–230
  See application file for complete search history.

(56) References Cited

U.S. PATENT DOCUMENTS

| | | | | |
|---|---|---|---|---|
| 8,965,560 | B2* | 2/2015 | Mathi | B65G 1/1378 700/216 |
| 2009/0129902 | A1* | 5/2009 | Schafer | B65G 1/1378 414/274 |
| 2009/0265031 | A1* | 10/2009 | Tachibana | B65G 1/0407 700/214 |
| 2014/0103113 | A1 | 4/2014 | Washiro | |
| 2016/0304282 | A1* | 10/2016 | Van De Veerdonk | B65G 1/1378 |
| 2020/0138207 | A1* | 5/2020 | Mishly | A47B 45/00 |

FOREIGN PATENT DOCUMENTS

| | | |
|---|---|---|
| CN | 102789601 | 11/2012 |
| CN | 103473658 | 12/2013 |
| CN | 203728014 | 7/2014 |
| CN | 103971222 | 8/2014 |
| CN | 104444007 | 3/2015 |
| CN | 105523332 | 4/2016 |
| CN | 105608549 | 5/2016 |
| CN | 106980955 | 7/2017 |
| ES | 2310573 | 1/2009 |
| JP | H03-3803 | 1/1991 |
| JP | H09-132308 | 5/1997 |
| JP | H11-301812 | 11/1999 |
| JP | 2001-039509 | 2/2001 |
| JP | 2002326707 | 11/2002 |
| JP | 2009096637 | 5/2009 |
| JP | 2013256371 | 12/2013 |
| JP | 2014-034442 | 2/2014 |

OTHER PUBLICATIONS

Extended Search Report issued in Corresponding European Patent Application No. 17876642.4 dated Aug. 12, 2019.
"The busiest Amazon "employee" in history | Big secret of warehouse robot Kiva" Wechsler Public Number, Published Jun. 26, 2016, 14 pages (English Translation provided).
Office Action issued in counterpart Chinese Application No. 201611078540.7, dated Sep. 3, 2019 (English Translation Provided).
International Search Report and Written Opinion issued in Corresponding International Patent Application No. PCT/CN2017/097165, dated Nov. 23, 2017.

* cited by examiner

STOCK SHELF MANAGEMENT METHOD AND DEVICE

CROSS-REFERENCE TO RELATED APPLICATIONS

The present application is a national phase under 35 U.S.C. § 371 of International Application No. PCT/CN2017/097165, filed Aug. 11, 2017, which claims the benefit of priority to Chinese patent application No. 201611078540.7, filed with the China National Intellectual Property Administration on Nov. 30, 2016, entitled "Stock Shelf Management Method And Device", each of which are incorporated herein by reference in their entirety.

TECHNICAL FIELD

The present application relates to the field of communication, and in particular, to a shelf management method and device.

BACKGROUND

A warehouse is a storage facility for stuffs. A warehouse includes a large number of shelves, trolleys and workbenches. A shelf bears various stuffs and can be conveyed, by a trolley, from a workbench for bale and delivery to a storage position of the warehouse where the shelf is typically arranged.

To deliver a stuff from the warehouse, the shelf bearing the stuff and storage position thereof are first to be determined. The shelf is conveyed by a trolley to the workbench from the storage position as determined. The stuff is then taken from the shelf, and baled on the workbench for delivery. The shelf is conveyed by the trolley back to the storage position after delivery.

In the implementation of the present application, applicant notes that the prior art has at least the following problem:

A shelf having stuffs frequently subject to deliveries may be remote from the workbench such that it may take a long time for the trolley to convey the shelf. Delivery efficiency is thus reduced.

SUMMARY

In order to improve the efficiency of delivery, the present application provides a shelf management method and device, a summary of which is provided below.

In one aspect, a shelf management method is provided, the method includes: controlling a conveying means to convey a first shelf to a workbench in a warehouse, the first shelf being a shelf in the warehouse;

controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

Optionally, controlling the conveying means to convey the first shelf to a workbench in a warehouse comprises:

receiving an order containing identification information of a stuff to be delivered; and controlling the conveying means to convey a first shelf storing the to-be-delivered stuff corresponding to the identification information to the workbench in the warehouse.

Optionally, the warehouse comprises a high-frequency area and a low-frequency area, and a distance between the high-frequency area and the workbench is less than a distance between the low-frequency area and the workbench;

controlling the conveying means to convey the first shelf to a first storage position in the warehouse comprises:

if there is an unoccupied storage position in the high-frequency area, selecting a storage position closest to the workbench as the first storage position; and controlling the conveying means to convey the first shelf to the first storage position.

Optionally, the method further includes:

if there is no unoccupied storage position in the high-frequency area, controlling the conveying means to convey a second shelf to a low-frequency storage position in a low-frequency area, the second shelf being a low-frequency shelf or an empty high-frequency shelf in the high-frequency area; and determining the storage position occupied by the second shelf in the high-frequency-area as the first storage position, and controlling the conveying means to convey the first shelf to the first storage position.

Optionally, the method further includes:

calculating a number of deliveries for each shelf in the warehouse according to history information that comprises correspondence between identification information of stuffs, delivery time and delivery amounts; and determining a preset number of shelves subject to the highest numbers of deliveries as high-frequency shelves, and determining shelves other than the high-frequency shelves in the warehouse as low-frequency shelves.

Optionally, calculating a number of deliveries for each shelf in the warehouse according to history information comprises:

calculating, according to the history information, an average number of deliveries for each stuff in a day and an average amount for each delivery;

determining a number of deliveries for each shelf in the warehouse, according to correspondence between identification information of stuffs, identification information of shelves and amounts of stuffs, the average number of deliveries for each stuff and the average amount for each delivery.

In another aspect, a shelf management device is provided, the device includes:

a first controlling module, configured for controlling a conveying means to convey a first shelf to a workbench in a warehouse, the first shelf being a shelf in the warehouse;

a second controlling module, configured for controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and a third controlling module, configured for controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

Optionally, the first controlling module includes:

a receiving unit, configured for receiving an order containing identification information of a stuff to be delivered;

a first controlling unit, configured for controlling the conveying means to convey, to the workbench in the warehouse, a first shelf storing the to-be-delivered stuff corresponding to the identification information.

Optionally, the warehouse includes a high-frequency area and a low-frequency area, and a distance between the high-frequency area and the workbench is less than a distance between the low-frequency area and the workbench;

the second controlling module includes:

a selecting unit, configured for selecting, if there is an unoccupied storage position in the high-frequency area, a storage position closest to the workbench as the first storage position;

a second controlling unit, configured for controlling the conveying means to convey the first shelf to the first storage position.

Optionally, the second controlling module further includes:

a third controlling unit, configured for controlling, if there is no unoccupied storage position in the high-frequency area, the conveying means to convey a second shelf to a low-frequency storage position in a low-frequency area, wherein the second shelf is a low-frequency shelf or an empty high-frequency shelf in the high-frequency area; and a fourth controlling unit, configured for determining the storage position occupied by the second shelf in the high-frequency-area as the first storage position, and controlling the conveying means to convey the first shelf to the first storage position.

Optionally, the apparatus further comprises:

a calculating module, configured for calculating a number of deliveries for each shelf in the warehouse according to history information, wherein the history information comprises correspondence between identification information of stuffs, delivery time and delivery amounts;

a setting module, configured for determining a preset number of the shelves subject to the highest numbers of deliveries as high-frequency shelves, and determining shelves other than the high-frequency shelves in the warehouse as low-frequency shelves.

Optionally, the calculating module includes:

a calculating unit, configured for calculating, according to the history information, an average number of deliveries for each stuff in a day and an average amount for each delivery;

a calculating unit, configured for determining a number of deliveries for each shelf in the warehouse, according to correspondence between identification information of stuffs, identification information of shelves and amounts of stuffs, the average number of deliveries for each stuff and the average amount for each delivery.

In still another aspect, an electronic device is provided. The device includes a processor and a memory. The memory is configured for storing executable program codes, and the processor executing the codes to perform any of the shelf management methods described above.

In still another aspect, an executable program code is provided, which performs, when executed, the shelf management methods as described above.

In a further aspect, a computer readable storage medium having executable program instructions stored thereon is provided. The instructions, when being executed, perform the shelf management method of any of the shelf management methods as described above.

The present application may achieve the following technical effects. A first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelves and thus improves the conveyance efficiency.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

FIG. 2-1 is a schematic view of the structure of a warehouse according to Embodiment 2 of the present application;

FIG. 2-2 is a flow chart of a shelf management method according to Embodiment 2 of the present application;

DETAILED DESCRIPTION

In order to make objectives, technical solutions and advantages of the present application more apparent, the present application now will be described in detail in association with the detailed description and reference is made to the drawings. Obviously, the embodiments described are only some of the embodiments of the present application instead of all the embodiments. All further embodiments obtained by those of ordinary skills in the art based on the embodiments herein without any creative efforts are within the scope of the present application.

In order to make the objects, technical solutions and advantages of the present application more clear, detailed description of various implementations is presented below with reference to drawings.

Embodiment 1

Figure 1:
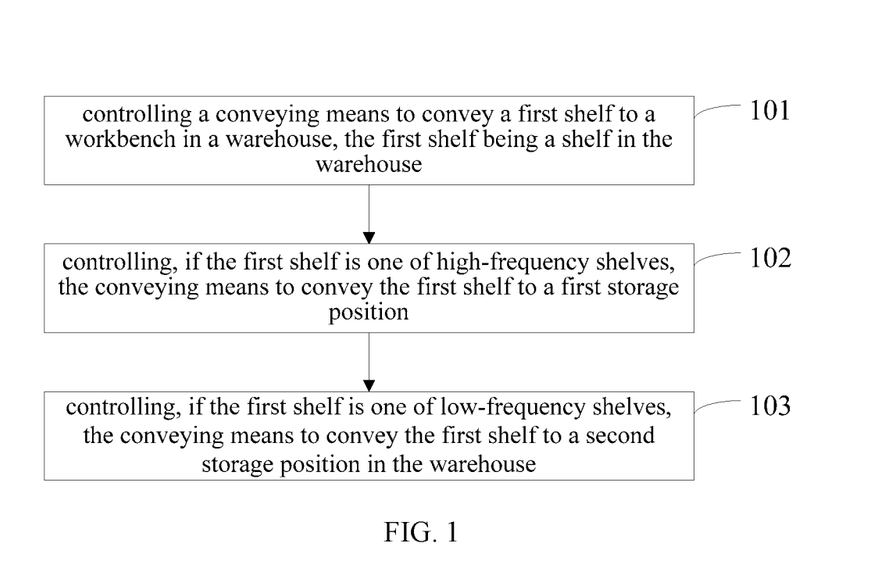
FIG. 1 is a flow chart of a shelf management method according to Embodiment 1 of the present application.

Referring to FIG. 1, a shelf management method according to an embodiment of the present application is illustrated. The method includes the following operations.

At 101, a conveying means is controlled to convey a first shelf to a workbench in a warehouse. The first shelf is a shelf in the warehouse.

At 102, if the first shelf is one of high-frequency shelves, the conveying means is controlled to convey the first shelf to a first storage position in the warehouse. High-frequency shelves may include a preset number of shelves that are most frequently subject to delivery in the warehouse.

At 103, if the first shelf is a low-frequency shelf, the conveying means is controlled to convey the first shelf to a second storage position in the warehouse. Low-frequency shelves refers to shelves other than the high-frequency shelves. The distance between the first storage position and the workbench is less than the distance between the second storage position and the workbench.

In an embodiment of the present application, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelves and thus improves the conveyance efficiency.

Embodiment 2

The embodiment of the present application provides a shelf management method. A shelf is, after a stuff is taken therefrom, conveyed by a conveying means to a first storage position if determined to be a high-frequency shelf, or conveyed to a second storage position if determined to be a low-frequency shelf. The distance between the first storage position and a workbench is less than the distance between the second storage position and the workbench.

Figure 21:
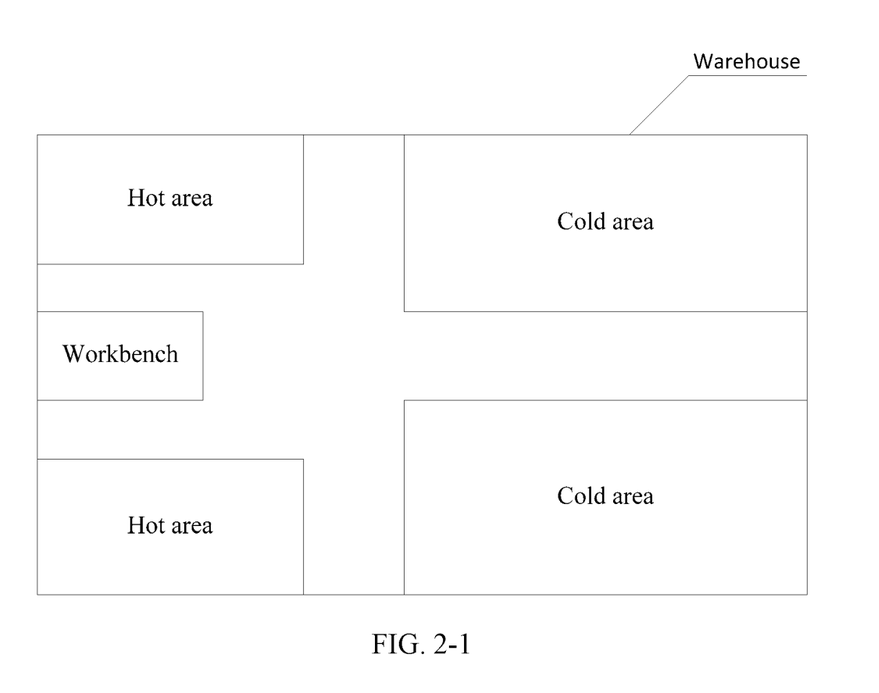

The method is applicable to a warehouse of a structure as shown in FIG. 2-1. The warehouse includes: a workbench, a hot area (a high-frequency area) and a cold area (a low-frequency area). The distance between the hot area and the workbench is less than the distance between the cold area and the workbench. The high-frequency area includes a preset number of storage positions.

Figure 22:
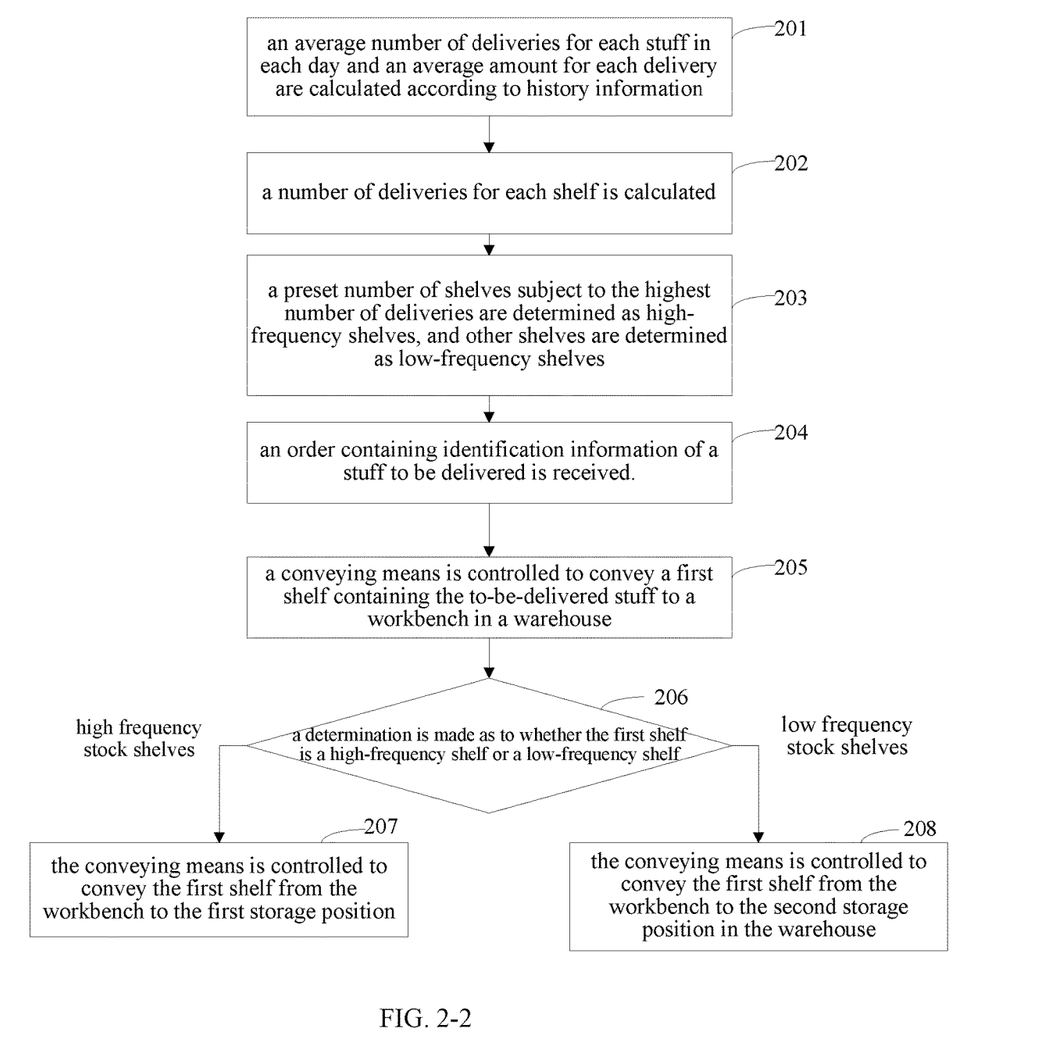

The embodiment may be implemented by a terminal, such as a computer. Referring to FIG. 2-2, the method includes the following operations.

At 201, an average number of deliveries for each stuff in a day and an average amount for each delivery are calculated according to history information.

The history information includes correspondence between identification information of stuffs, and delivery time and delivery amounts of stuffs. The correspondence records the identification information of stuff in each previous delivery, and the time and amount for each delivery, i.e., each correspondence item includes the identification information of a stuff, and delivery times and delivery amounts thereof.

Each correspondence item as stored may be for a preset number of days immediately previous to the current time, for example, 5, 6 or 7 days. In a case of 7 days, for example, the correspondence may be for the 7 days immediately previous to the current time.

In addition, the correspondence may be detected in real time. An item detected as being generated more than a predetermined number of days before the current time can be removed. In practice, the delivery time of each correspondence item may be detected. An item the delivery time of which is more than a predetermined number of days away from the current time is determined to be generated more than a predetermined number of days before the current time and can be removed.

The operation may include the following steps. A total number of history deliveries and total history delivery amounts for each stuff are calculated according to the identification, delivery times and delivery amounts of the stuff as stored in the history information. The average number of deliveries of a stuff in a single day is calculated according to the total number of history deliveries of the stuff, and the average amount for each delivery is calculated according to the total number of history deliveries times and total history delivery amounts.

In this embodiment, the average number of deliveries of a stuff is taken as the number of deliveries for the day immediately after the current time, and the average amount for each delivery is taken as the amount for each delivery for the day immediately after the current time. As such, on the basis of the average number of deliveries for each stuff and the average amount for each delivery, a number of deliveries for each shelf in the day immediately after the current time may be estimated. The detailed process is as follows.

At 202, a number of deliveries for each shelf is calculated according to correspondence between identification information of stuffs, identifications of shelves and amounts of stuffs, the average number of deliveries for each stuff and the average amount for each delivery.

The stuffs on each shelf in the warehouse are laid by a personnel. When a personnel places a stuff on a shelf, the identification information of the stuff, the identification information of the shelf, and an amount of the stuff can be recorded by the personnel so as to have a correspondence between the identification information of the stuff, the identification information of the shelf, and the amount of the stuff.

A detailed process of this step may include the following operations 2021 to 2023.

At 2021, all third shelves bearing the first stuff and an amount of the first stuff on each of the third shelves are determined based on identification information of a first stuff and correspondence between identification information of stuffs, identification information of shelves and amounts of stuffs. The first stuff may be any of the stuffs in the warehouse.

Specifically, identification information of shelves corresponding to the identification information of the first stuff, and amount of the first stuff on each of these shelves are determined according to the identification information of the first stuff and the correspondence described above. Shelves having the first stuff are thus determined on these identification information and identified as the third shelves.

At 2022, a number of deliveries for the first stuff on each third shelf is determined according to an average number of deliveries for the first stuff, an average amount of each delivery of the first stuff and an amount of the first stuff on each third shelf.

Specifically, according to an estimated total delivery amount of the first stuff, an estimated average delivery amount for each time, and the amount of the first stuff on each third shelf, a number of deliveries for the first stuff on each third shelf is determined through a preset delivery strategy.

According to the preset delivery strategy, a third shelf having a larger amount of the first stuff is determined to be subject to a greater number of deliveries, and a third shelf having a less amount of the first stuff is determined to be subject to a less number of deliveries.

In an example, the average number of deliveries of the first stuff is 5, and the average amount for each delivery is 200, i.e., the number of deliveries for the first stuff is 5 and the amount for each delivery is 200 for the day immediately after the current time. Three shelves A, B and C in the warehouse have respectively an amount of the first stuff of 800, 600 and 400. As such, the number of deliveries for the first stuff on shelf A is 4, the number of deliveries for the first stuff on the shelf B is 1, and the number of deliveries for the first stuff on the shelf C is 0.

The number of deliveries for each other stuff on a shelf is calculated according to the operations of 2021 and 2022 described above. In an example, shelf A has a second stuff and a third stuff, and shelf B also has the second stuff. The number of deliveries for the second stuff on shelf A is calculated, according to the operations of 2021 and 2022 described above, to be 2. The number of deliveries for the second stuff on shelf B is calculated to be 3. The number of deliveries for the third stuff on shelf A is calculated, according to the operations of 2021 and 2022 described, to be 4.

At 2023, the number of deliveries for each shelf in the warehouse is calculated according to the numbers of deliveries for all the stuffs stored thereon.

The numbers of deliveries for all the stuffs stored on a shelf are summed to obtain the number of deliveries for the shelf. This obtained number of deliveries is taken as the number of deliveries for the shelf in the day after the current time. For example, the number of deliveries for the shelf A is determined to be 10, i.e., the sum of the numbers of deliveries for the first, second and third stuff stored thereon, which are 4, 2 and 4 respectively. For another example, the number of deliveries for the shelf B is determined to be 4, i.e., the sum of the numbers of deliveries for the first and second stuff stored thereon, which are 1 and 4 respectively.

At 203, a preset number of shelves subject to the highest number of deliveries are determined as high-frequency shelves, and shelves other than the high-frequency shelves in the warehouse are determined as low-frequency shelves.

This operation may include the following steps. All the shelves are ranked in a decreasing order in terms of number of deliveries. A preset number of foremost shelves are selected. The identification information of the selected shelves are put into a set of identification information. As such, a preset number of shelves subject to the highest number of deliveries are determined as high-frequency shelves, and shelves other than the high-frequency shelves in the warehouse are determined as low-frequency shelves.

After 203, a terminal may receive an order including identification information of a stuff to be delivered and a delivery amount thereof. The terminal may deliver stuffs as described below.

At 204, an order is received. The order includes identification information of a stuff to be delivered.

The order may also include an delivery amount of the stuff.

The order may be sent to the terminal by a background server of a shopping web site, or may be input to the terminal by a personnel.

At 205, a conveying means is controlled to convey a first shelf containing the to-be-delivered stuff to a workbench in a warehouse.

The conveying means may be a trolley. An idle conveying means that is close to the workbench may be selected to convey the first shelf. The terminal also maintains correspondence between identification information and storage positions of shelves. The correspondence represents the identification information and the storage positions of all the shelves in the warehouse.

This operation may include the following steps. Based on identification information of stuffs to be delivered, identification information of the shelves where the stuffs to be delivered are stored may be obtained from the correspondence between identification information of stuffs, identification information of shelves and amounts of stuffs. Based on the obtained shelf identification information, storage positions of the shelves are determined from correspondence between identification information of shelves and storage positions of shelves. A shelf closest to the workbench is selected as a first shelf. A conveying order is sent to the conveying means. The conveying order contains the storage position of the first shelf, so that the conveying means conveys the first shelf to the workbench.

After receiving the conveying order, the conveying means automatically determines a path for conveyance of the first shelf according to the storage position of the first shelf contained in the conveying order, and implement the conveyance according to the path. The first shelf may be in a low-frequency area or in a high-frequency area.

The conveying means may send a notification to the terminal after the conveyance of the first shelf from the storage position. The terminal may delete the correspondence item including identification information of the first shelf and storage position of the first shelf. The storage position of the first shelf thus becomes unoccupied.

After the first shelf is conveyed to the workbench, a personnel may fetch the stuff to be delivered from the first shelf in some delivery amount, and bale the fetched stuff for delivery.

In delivery of a stuff, the terminal may also obtain the current time as delivery time of the stuff, and store identification, the delivery time and the delivery amount of the stuff in the correspondence between identification information of stuffs, delivery time and delivery amounts in the history information.

The personnel may also input to the terminal an amount of stuff that has been fetched from the first shelf for delivery. The terminal then obtains the amount of stuff to be delivered from correspondence between identification information of shelves, identification information of stuffs and amounts of stuffs, according to identification information of the first shelf and identification information of the stuff to be delivered. The amount to be delivered is then reduced by the amount as fetched.

The terminal controls the conveying means to convey the first shelf back to storage position after the stuff to be delivered has been fetched from the shelf.

At 206, a determination is made as to whether the first shelf is a high-frequency shelf or a low-frequency shelf. The method proceeds to 207 in the former case or otherwise proceeds to 208 in the latter case.

Specifically, a set of identification s is searched for the identification information of the first shelf. If the identification information of the first shelf is included in the set, the first shelf is determined to be a high-frequency shelf; or otherwise he first shelf is determined to be a low-frequency shelf.

At 207, the conveying means is controlled to convey the first shelf from the workbench to the first storage position, the first storage position being a storage position in the high-frequency area of the warehouse.

This may be implemented through the following operations 2071 to 2074.

At 2071, a determination is made as to whether there is an unoccupied storage position in the high-frequency area. If there is an unoccupied position, the flow proceeds to 2072, or otherwise, the flow proceeds to 2073.

The correspondence between identification information of shelves and storage positions indicates occupied storage positions. Thus, the determination as to unoccupied storage position may be made according to the such correspondence.

For example, a high-frequency area includes storage positions 1, 2, 3, 4 and 5, and storage positions 1, 2, 3, 7, 8 and 9 are now occupied. Positions 4 and 5 can thus be determined to be unoccupied.

At 2072, a storage position closest to the workbench is selected as the first storage position, and the conveying means is controlled to convey the first shelf back to the first storage position.

A conveying order containing the first storage position may be sent to the conveying means such that the conveying means can determine a path in which the first shelf is to be conveyed to the first storage position and implement the conveyance accordingly.

The identification information of the first shelf and the first storage position may also be stored in the correspondence between the identification information of shelves and the storage positions.

At 2073, the conveying means is controlled to convey a second shelf to a low-frequency storage position in a low-frequency area. The second shelf may be a low-frequency shelf or an empty high-frequency shelf in the high-frequency area.

In the former case, a low-frequency shelf is identified in the high-frequency area, taken as a second shelf, and then conveyed to a low-frequency storage position in the low-frequency area. A detailed implementation is as follows.

Identifications of all the shelves in the high-frequency area are obtained from correspondence between identification information of shelves and storage positions. An shelf in the high-frequency area having identification information that is not within the set of identification information is identified as a low-frequency shelf, i.e., a second shelf, and is then conveyed, by the conveying means, to a selected low-frequency position within the low-frequency area.

In the latter case, an empty high-frequency shelf is identified within the high-frequency area and taken as a second shelf. The second shelf is then conveyed to a low-frequency storage position in the low-frequency area. An detailed implementation process is as follows.

Identifications of all the high-frequency shelves in the high-frequency area are obtained from the correspondence between identification information of shelves and storage positions, according to each storage position in the high-frequency area and the identification information of each shelf in the set of identification information. Based on identification information of each high-frequency shelf, amounts of stuffs in each high-frequency shelf are obtained from correspondence between identification information of stuffs, identification information of shelves and amounts of stuffs. A high-frequency shelf without any of the stuffs is determined as an unoccupied high-frequency shelf and conveyed to a selected low-frequency position.

After the conveyance of the second shelf to the selected low-frequency storage position by the conveying means, the correspondence between identification information of shelves and storage positions may be accordingly updated.

The detailed process of the conveyance of the second shelf to the selected low-frequency storage position can be known with reference to foregoing description, and will not repeated herein.

At 2074, a storage position occupied by the second shelf in the high-frequency area is taken as the first storage position. The conveying means is controlled to convey the first shelf from the workbench to the first storage position.

The identification information of the first shelf and the first storage position may also be stored in the correspondence between identification information of the shelves and storage positions.

The conveyance of the first shelf to a first storage is omitted for brevity herein. For details, reference can be made to foregoing descriptions.

At 208, the conveying means is controlled to convey the first shelf from the workbench to the second storage position in the warehouse. The second storage position is a storage position in the low-frequency area of the warehouse.

A storage position closest to the workbench is selected from unoccupied storage positions in the low-frequency area of the warehouse as the second storage position. The conveying means is controlled to convey the first shelf to the second storage position.

The identification information of the first shelf and the selected second storage position may also be stored in the correspondence between identification information of shelves and storage positions.

The conveyance of the first shelf to a second storage is omitted for brevity herein. For details, reference can be made to foregoing descriptions.

In an embodiment of the present application, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelf and thus improves the conveyance efficiency.

Embodiment 3

Figure 3:
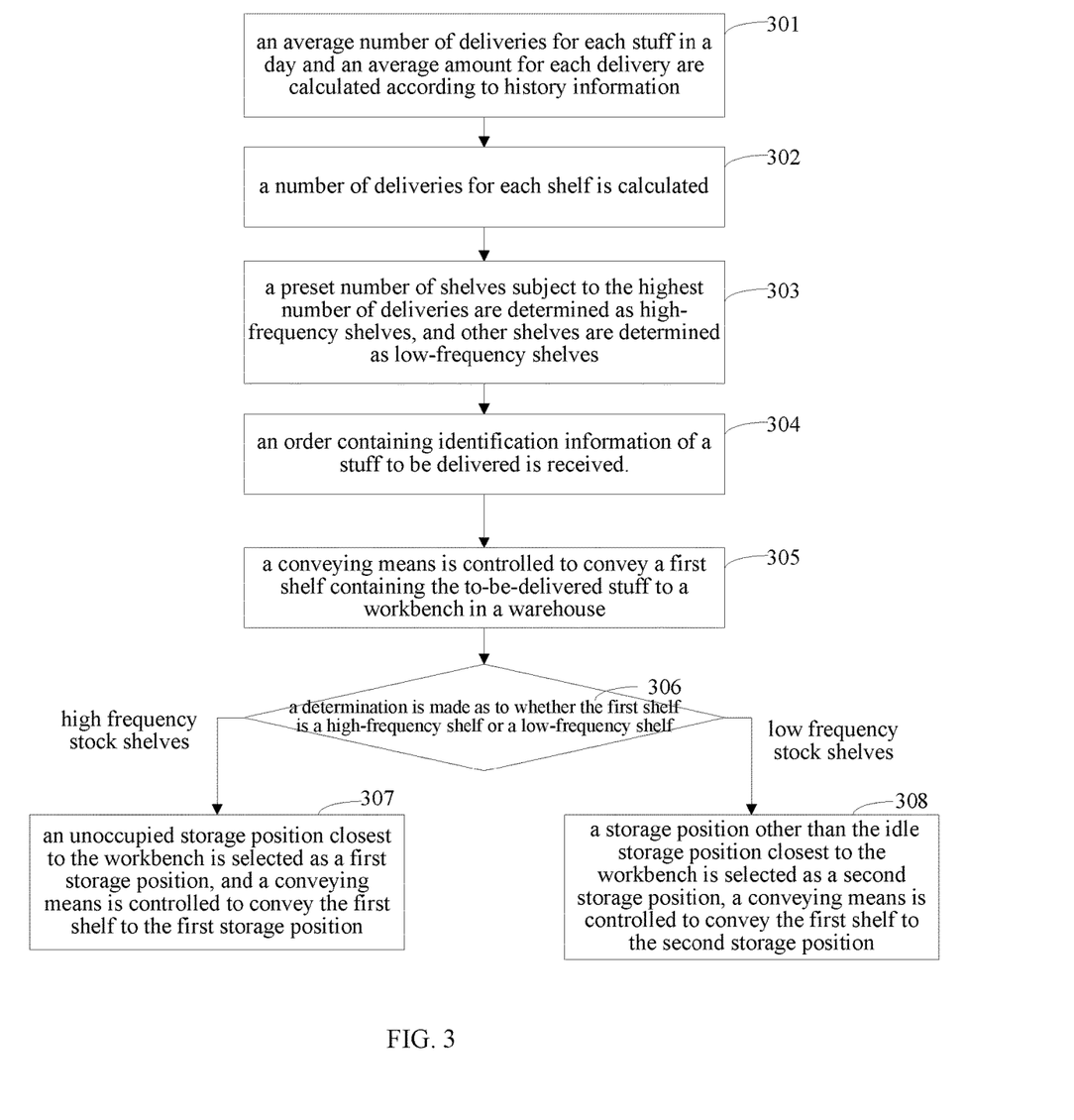
FIG. 3 is a flow chart of a shelf management method according to Embodiment 3 of the present application.

The embodiment of the present application provides a shelf management method. A first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. As shown in FIG. 3, the step include operations 301-308.

Operations 301-306 are essentially the same with operations 201-206, the description thereof is thus omitted here.

At Step 307, an unoccupied storage position closest to the workbench is selected as a first storage position, and a conveying means is controlled to convey the first shelf to the first storage position.

A conveying order containing the first storage position may be sent to a conveying means. The conveying means receiving the conveying order can determine a path in which the first shelf is to be conveyed to the first storage position and implement the conveyance accordingly.

At Step 308, a storage position other than the idle storage position closest to the workbench is selected as a second storage position, a conveying means is controlled to convey the first shelf to the second storage position.

A conveying order containing the second storage position may be sent to a conveying means. The conveying means receiving the conveying order can determine a path in which the second shelf is to be conveyed to the second storage position and implement the conveyance accordingly.

In an embodiment of the present application, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelf and thus improves the conveyance efficiency.

Embodiment 4

Figure 4:
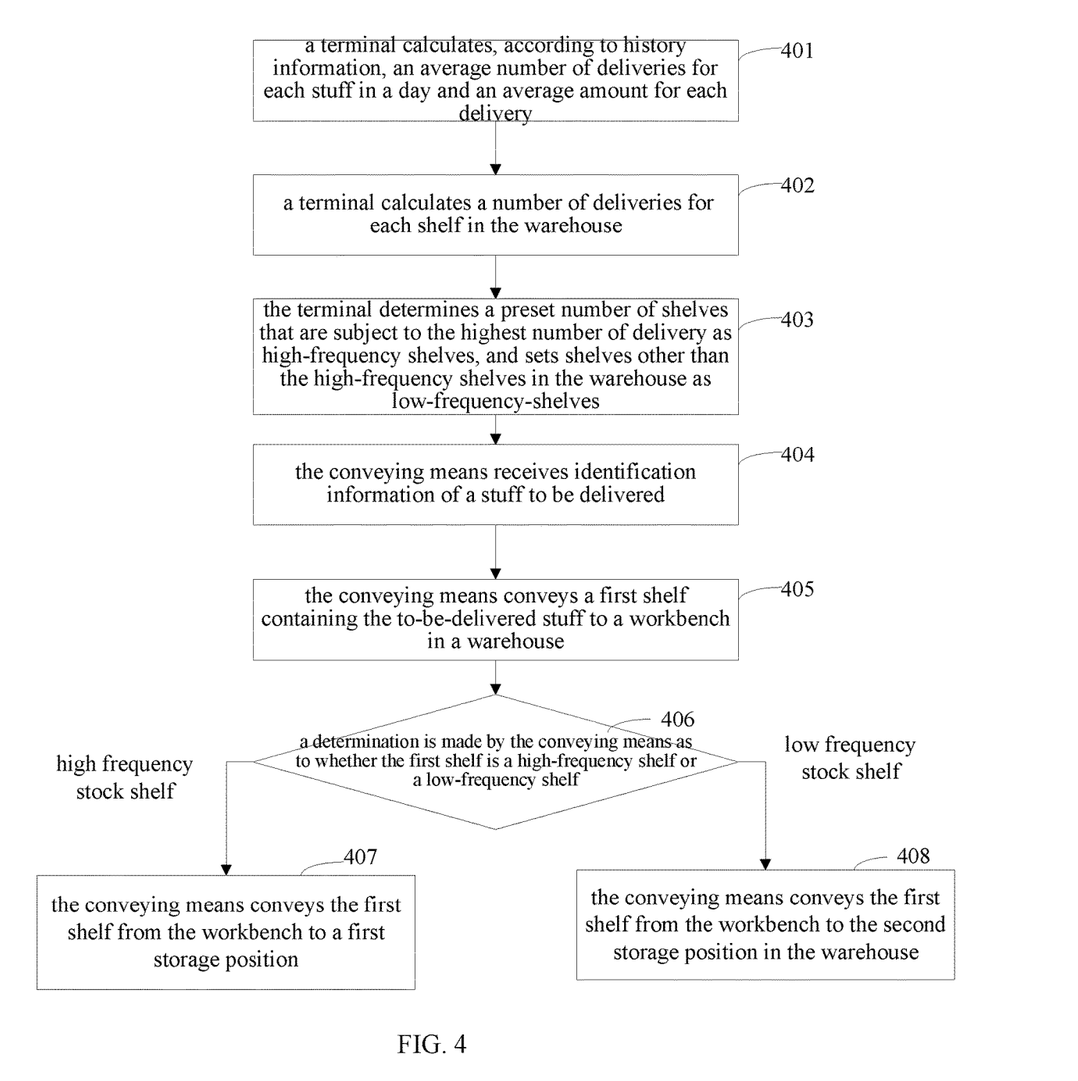
FIG. 4 is a flow chart of a shelf management method according to Embodiment 4 of the present application.

The embodiment of the present application provides a shelf management method. The method is applied to a warehouse structure as shown in FIG. 2-1, in which the conveying means convey a shelf to a high-frequency area or a low-frequency area according to the type of the shelf. Referring to FIG. 4, the method includes the following operations.

At 401, a terminal calculates, according to history information, an average number of deliveries for each stuff in a day and an average amount for each delivery.

The detailed process of calculating the average number of deliveries for each stuff in a day and an average delivery amount for each delivery can be known with reference to operation 201, and is thus omitted here.

At 402, a terminal calculates a number of deliveries for each shelf in the warehouse according to correspondence between identification information of stuffs, identification information of shelves and amounts of stuffs, the average number of deliveries for each stuff and the average amount for each delivery.

The detailed process of calculating the number of deliveries for each shelf can be known with reference to operation 202, and is thus omitted here.

At 403, the terminal determines a preset number of shelves that are subject to the highest number of delivery as high-frequency shelves, and sets shelves other than the high-frequency shelves in the warehouse as low-frequency-shelves.

After the operation 403, the conveying means may receive an identification information of a stuff to be delivered. The conveying means is capable of processing, calculation and communication. The conveying means may be a trolley. After the conveying means receives the identification information of the stuff to be delivered, the stuff to be delivered may be delivered through the operations described below.

At 404, the conveying means receives identification information of a stuff to be delivered.

A terminal may receive an order sent by a background server of a shopping website, or may receive order input by a personnel. The order may include the identification information of a stuff to be delivered. After receiving the order, the terminal may select an idle conveying means near the workbench, and then send the identification information of the stuff to be delivered included in the order to the conveying means.

At 405, the conveying means conveys a first shelf containing the to-be-delivered stuff to a workbench in a warehouse.

The terminal also maintains correspondence between identification information and storage positions of shelves. The correspondence represents the identification information and the storage positions of all the shelves in the warehouse.

This operation may include the following steps. Based on identification information of stuffs to be delivered, identification information of the shelves where the stuffs to be delivered are stored may be obtained by the conveying means from the correspondence between identification information of stuffs, identification information of shelves and amounts of stuffs. Based on the obtained shelf identification information, storage positions of the shelves are determined from correspondence between identification information of shelves and storage positions of shelves. A shelf closest to the workbench is selected as a first shelf. A conveying order is sent to the conveying means. The conveying order contains the storage position of the first shelf, so that the conveying means conveys the first shelf to the workbench.

The conveying means may send a notification to the terminal in the conveyance of the first shelf from the storage position. The terminal may delete the correspondence item including identification information of the first shelf and storage position of the first shelf. The storage position of the first shelf becomes unoccupied.

The conveying means may send a notification to the terminal after the conveyance of the first shelf from the storage position. The terminal may delete the correspondence item including identification information of the first shelf and storage position of the first shelf. The storage position of the first shelf thus becomes unoccupied.

After the first shelf is conveyed to the workbench, a personnel may fetch the stuff to be delivered from the first shelf in some delivery amount, and bale the fetched stuff for delivery.

In delivery of a stuff, the terminal may also obtain the current time as delivery time of the stuff, and store identification, the delivery time and the delivery amount of the stuff in the correspondence between identification information of stuffs, delivery time and delivery amounts in the history information After taking out the stuffs to be delivered from the first shelf, the conveying means also needs to convey the first shelf back to storage position of the warehouse according to the following process.

At 406, a determination is made by the conveying means as to whether the first shelf is a high-frequency shelf or a low-frequency shelf. The method proceeds to 407 in the former case or otherwise proceeds to 408 in the latter case.

Specifically, the conveying means obtains a set of identification information from the terminal. The set of identification information includes identification information of high-frequency shelves. A set of identification s is searched for the identification information of the first shelf. If the identification information of the first shelf is included in the set, the first shelf is determined to be a high-frequency shelf; or otherwise he first shelf is determined to be a low-frequency shelf.

At 407: the conveying means conveys the first shelf from the workbench to a first storage position, the first storage position being one storage position in the high-frequency area of the warehouse.

This may be implemented through the following operations 4071 to 4074.

At 4071, the conveying means determines whether there is an unoccupied storage position in the high-frequency area. if there is an unoccupied position, the flow proceeds to 4072, or otherwise, the flow proceeds to 4073.

The correspondence between identification information of shelves and storage positions indicates occupied storage positions. Thus, the determination as to unoccupied storage position may be made, by the conveying means, according to the such correspondence.

For example, a high-frequency area includes storage positions 1, 2, 3, 4 and 5, and storage positions 1, 2, 3, 7, 8 and 9 are now occupied. Positions 4 and 5 can thus be determined to be unoccupied.

At 4072, the conveying means selects a storage position closest to the workbench as the first storage position, and conveys the first shelf from the workbench to the first storage position.

The conveying means may also send identification information of the first shelf and the first storage position to the terminal. The terminal stores the identification information of the first shelf and the first storage position in the correspondence between identification information of shelves and storage positions.

At 4073, the conveying means conveys a second shelf to a low-frequency storage position in a low-frequency area, the second shelf being a low-frequency shelf or empty high-frequency shelf in the high-frequency area.

In the former case, a low-frequency shelf is identified in the high-frequency area, taken as a second shelf, and then conveyed to a low-frequency storage position in the low-frequency area. A detailed implementation is as follows.

Identifications of all the shelves in the high-frequency area are obtained from correspondence between identification information of shelves and storage positions. An shelf in the high-frequency area having identification information that is not within the set of identification information is identified as a low-frequency shelf, i.e., a second shelf, and is then conveyed, by the conveying means, to a selected low-frequency position within the low-frequency area.

In the latter case, an empty high-frequency shelf is identified within the high-frequency area and taken as a second shelf. The second shelf is then conveyed to a low-frequency storage position in the low-frequency area. An detailed implementation process is as follows.

Identifications of all the high-frequency shelves in the high-frequency area are obtained from the correspondence between identification information of shelves and storage positions, according to each storage position in the high-frequency area and the identification information of each shelf in the set of identification information. Based on identification information of each high-frequency shelf, amounts of stuffs in each high-frequency shelf are obtained from correspondence between identification information of stuffs, identification information of shelves and amounts of stuffs. A high-frequency shelf without any of the stuffs is determined as an unoccupied high-frequency shelf and conveyed to a selected low-frequency position.

The conveying means may also send identification information of the second shelf and the selected low-frequency storage position to the terminal. The terminal may accordingly update the correspondence between identification information of shelves and storage positions.

At 4074, the conveying means takes a storage position occupied by the second shelf in the high-frequency area as the first storage position, and conveys the first shelf to the first storage position, and returns at the end.

The conveying means may also send identification information of the first shelf and the first storage position to a terminal, and the terminal stores the identification information of the first shelf and the first storage position in the correspondence between the identification information of the shelf and the storage position.

At 408, the conveying means conveys the first shelf from the workbench to the second storage position in the warehouse. The second storage position is a storage position in the low-frequency area of the warehouse.

A storage position closest to the workbench is selected by the conveying means from unoccupied storage positions in the low-frequency area of the warehouse as the second storage position. The conveying means then conveys the first shelf to the second storage position.

The identification information of the first shelf and the selected second storage position may also be stored in the correspondence between identification information of shelves and storage positions.

In an embodiment of the present application, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelf and thus improves the conveyance efficiency.

Embodiment 5

Figure 5:
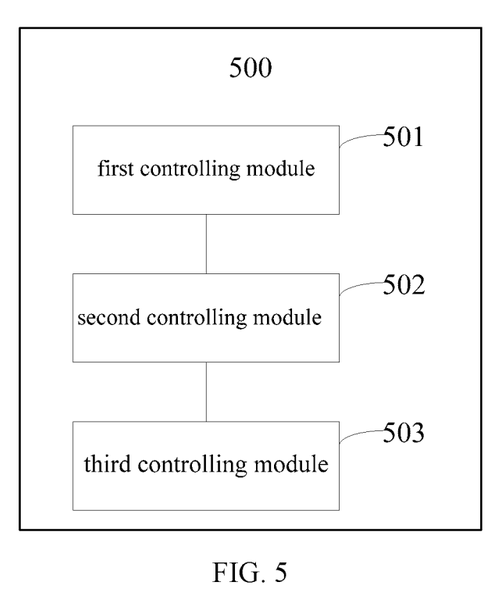
FIG. 5 is a schematic view of the structure of a shelf management apparatus according to Embodiment 5 of the present application.

Referring to FIG. 5, a shelf management apparatus 500 according to an embodiment of the present application is illustrated. The apparatus 500 includes a first controlling module 501, a second controlling module 502, and a third controlling module 503.

The first controlling module 501 is configured for controlling a conveying means to convey a first shelf to a workbench in a warehouse, the first shelf being a shelf in the warehouse.

The second controlling module 502 is configured for controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse.

The third controlling module 503 is configured for controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

Optionally, the first controlling module 501 includes a receiving unit and a first controlling unit. The receiving unit is configured for receiving an order containing identification information of a stuff to be delivered. The first controlling unit is configured for controlling the conveying means to convey, to the workbench in the warehouse, a first shelf storing the to-be-delivered stuff corresponding to the identification information.

Optionally, the warehouse includes a high-frequency area and a low-frequency area, and a distance between the high-frequency area and the workbench is less than a distance between the low-frequency area and the workbench.

The second controlling module 502 includes a selecting unit and a second controlling unit. The selecting unit is configured for selecting, if there is an unoccupied storage position in the high-frequency area, a storage position closest to the workbench as the first storage position. The second controlling unit is configured for controlling the conveying means to convey the first shelf to the first storage position.

Optionally, the second controlling module 502 further comprises a third controlling unit and a fourth controlling unit.

The third controlling unit is configured for controlling, if there is no unoccupied storage position in the high-frequency area, the conveying means to convey a second shelf to a low-frequency storage position in a low-frequency area, wherein the second shelf is a low-frequency shelf or an empty high-frequency shelf in the high-frequency area.

The fourth controlling unit is configured for determining the storage position occupied by the second shelf in the high-frequency-area as the first storage position, and controlling the conveying means to convey the first shelf to the first storage position.

Optionally, the apparatus 500 further includes a calculating module and a setting module.

The calculating module is configured for calculating a number of deliveries for each shelf in the warehouse according to history information, wherein the history information comprises correspondence between identification information of stuffs, delivery time and delivery amounts.

The setting module is configured for determining a preset number of the shelves subject to the highest numbers of deliveries as high-frequency shelves, and determining shelves other than the high-frequency shelves in the warehouse as low-frequency shelves.

Optionally, the calculating module includes a calculating unit and a determining unit.

The calculating unit is configured for calculating, according to the history information, an average number of deliveries for each stuff in a day and an average amount for each delivery;

The determining unit is configured for determining a number of deliveries for each shelf in the warehouse, according to correspondence between identification information of stuffs, identification information of shelves and amounts of stuffs, the average number of deliveries for each stuff and the average amount for each delivery.

In an embodiment of the present application, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelves and thus improves the conveyance efficiency.

Embodiment 6

Figure 6:
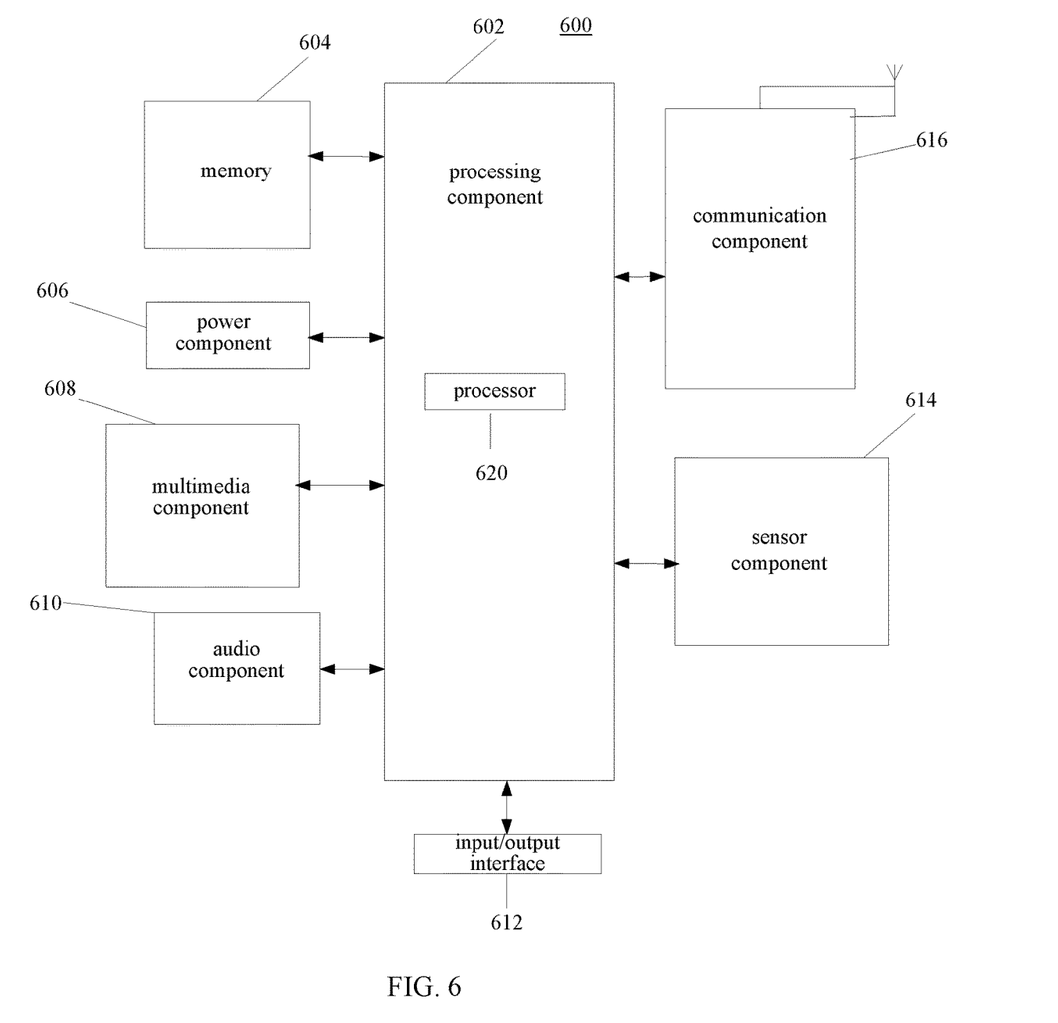
FIG. 6 is a schematic view of the structure of a shelf management apparatus according to Embodiment 6 of the present application.

FIG. 6 is a block diagram of a shelf management device 600 in accordance with an exemplary embodiment. The device 600 may perform a shelf management method as described above. For example, the device 600 may be a mobile terminal, a computer, a message transceiver, a tablet device, a personal digital assistant, and the like.

As shown in FIG. 6, the device 600 may include one or more of a processing component 602, a memory 604, a power component 606, a multimedia component 608, an audio component 610, an input/output (I/O) interface 612, a sensor component 614, and a communication component 616.

The processing component 602 typically controls the overall operations of the device 600, such as operations associated with display, telephone call, data communication, camera operation and recording operation. The processing component 602 may include one or more processors 602 to execute instructions to perform all or part of the steps of the above described methods. Furthermore, the processing component 602 may include one or more modules to facilitate interactions between the component 602 and other components. For example, the processing component 602 may include a multimedia module to facilitate the interaction between the multimedia component 608 and the processing component 602.

The memory 604 is configured for storing various types of data to support operations of the device 600. Examples of the data include instructions for any application program or method executed on the device 600, contact data, phone book data, messages, pictures, videos, and the like for any application or methods operating on the device 600. The memory 604 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 606 provides power for various components of the device 600. The power component 606 may include a power management system, one or more power supplies, and other components associated with generation, management, and distribution of power for the device 600.

The multimedia component 608 includes a screen to provide an output interface between the device 600 and a user. In some embodiments, the screen may be a liquid crystal display (LCD) or a touch panel (TP). In the case of a touch panel, the screen may be implemented as a touch screen that receives input signals from the user. The touch panel includes one or more touch sensors to sense touches, slides, and gestures on the touch panel. The touch sensor may sense not only a boundary of a touch or sliding action, but also may detect the duration and pressure associated with the touch or slide operation. In some embodiments, the multimedia component 608 includes a front camera and/or a rear camera. When the device 600 is in an operation mode, such as a shoot mode or a video mode, the front camera and/or the rear camera may receive external multimedia data. Each front and rear camera may be a system of a fixed focal length or capable of optical zooming.

The audio component 610 is configured for inputting and/or outputting an audio signal. For example, the audio component 610 includes a microphone (MIC) that is configured for receiving an external audio signal when the device 600 is in an operational mode, such as a call mode, a recording mode, and a voice recognition mode. The received audio signal may be further stored in the memory 604 or sent via the communication component 616. In certain embodiments, the audio component 610 further includes a loudspeaker for outputting an audio signal.

I/O interface provides an interface between the processing component 602 and peripheral interface modules. The peripheral interface modules may include a keyboard, a click wheel, buttons, or the like. The buttons may include but are not limited to, a home button, a volume button, a start button, and a lock button.

The sensor component 614 includes one or more sensors for providing status assessment on various aspects of the device 600. For example, the sensor component 614 may detect an on/off state of the device 600, positions of components. Examples of the sensor component may include a display and keypad of the device 600. The sensor component 614 may also detect a change in the position of the device 600 or a component thereof, a touch of the device 600 by a user, an orientation or acceleration/deceleration of the device 600 and the temperature change of the device 600. The sensor component 614 may include a proximity sensor configured for detecting the presence of nearby objects without any physical contact. The sensor component 614 may further include an optical sensor, such as a CMOS or CCD image sensor, for use in imaging applications. In certain embodiments, the sensor component 614 may further include an acceleration sensor, a gyro sensor, a magnetic sensor, a pressure sensor, or a temperature sensor.

The communication component 616 is configured for facilitating wired or wireless communication between the device 600 and other devices. The device 600 may access a wireless network based on a communication standard, such as Wi-Fi, 2G or 3G, or a combination thereof. In one exemplary embodiment, the communication component 616 receives broadcast signals or broadcast associated information from an external broadcast management system via a broadcast channel. In one exemplary embodiment, the communication component 616 further include a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the device 600 may be implemented by one or more application specific integrated circuits (ASICs), digital signal processors (DSPs), digital signal processing devices (DSPDs), programmable logic devices (PLDs), field programmable A gate array (FPGA), controller, microcontroller, microprocessor, or other electronic components for performing the above methods.

In an exemplary embodiment, a non-transitory computer readable storage medium comprising instructions is also provided, such as a memory 604 comprising instructions executable by the processor 620 of the device 600 for performing the above methods. For example, the non-transitory computer readable storage medium may be a ROM, a random access memory (RAM), a CD-ROM, a magnetic tape, a floppy disk, and an optical data storage device, and the like.

Embodiment 7

Figure 7:
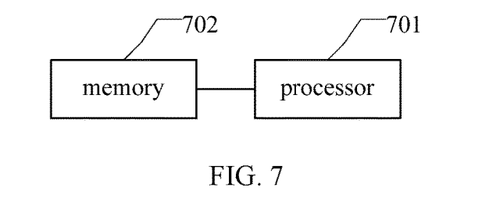
FIG. 7 is a schematic view of the structure of an electronic device according to Embodiment 7 of the present application.

The embodiment of the present application provides an electronic device. As shown in FIG. 7, the electronic device may include: a processor 701 and a memory 702, wherein the memory 702 is configured for storing executable program code, and the processor 701 is able to execute the code stored in the memory 702 to perform any of the shelf management method described above. The method may include:

controlling a conveying means to convey a first shelf to a workbench in a warehouse, the first shelf being a shelf in the warehouse;

controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

In the embodiment illustrated in FIG. 7, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelves and thus improves the conveyance efficiency.

The embodiment of the present application further provides an executable program code, which performs, when being executed, the shelf management method described above. The method may include:

controlling a conveying means to convey a first shelf to a workbench in a warehouse, the first shelf being a shelf in the warehouse;

controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

In the embodiment, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelves and thus improves the conveyance efficiency.

The embodiment of the present application further provides a computer readable storage medium having executable program instructions stored thereon, which, when executed, perform the shelf management method described above. The method includes:

controlling a conveying means to convey a first shelf to a workbench in a warehouse, the first shelf being a shelf in the warehouse;

controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

Optionally, controlling the conveying means to convey the first shelf to a workbench in a warehouse comprises:

receiving an order containing identification information of a stuff to be delivered; and controlling the conveying means to convey a first shelf storing the to-be-delivered stuff corresponding to the identification information to the workbench in the warehouse.

Optionally, the warehouse comprises a high-frequency area and a low-frequency area, and a distance between the high-frequency area and the workbench is less than a distance between the low-frequency area and the workbench;

controlling the conveying means to convey the first shelf to a first storage position in the warehouse comprises:

if there is an unoccupied storage position in the high-frequency area, selecting a storage position closest to the workbench as the first storage position; and controlling the conveying means to convey the first shelf to the first storage position.

Optionally, the method further includes:

if there is no unoccupied storage position in the high-frequency area, controlling the conveying means to convey a second shelf to a low-frequency storage position in a low-frequency area, the second shelf being a low-frequency shelf or an empty high-frequency shelf in the high-frequency area; and determining the storage position occupied by the second shelf in the high-frequency-area as the first storage position, and controlling the conveying means to convey the first shelf to the first storage position Optionally, the method further includes:

calculating a number of deliveries for each shelf in the warehouse according to history information that comprises correspondence between identification information of stuffs, delivery time and delivery amounts; and determining a preset number of shelves subject to the highest numbers of deliveries as high-frequency shelves, and determining shelves other than the high-frequency shelves in the warehouse as low-frequency shelves.

Optionally, calculating a number of deliveries for each shelf in the warehouse according to history information comprises:

calculating, according to the history information, an average number of deliveries for each stuff in a day and an average amount for each delivery;

determining a number of deliveries for each shelf in the warehouse, according to correspondence between identification information of stuffs, identification information of shelves and amounts of stuffs, the average number of deliveries for each stuff and the average amount for each delivery.

In an embodiment of the present application, a first shelf is, after a stuff is taken therefrom, conveyed by a conveying means to a first storage position if it is a high-frequency shelf, or conveyed to a second storage position if it is a low-frequency shelf. The first storage position is closer to a workbench than the second storage position. In this way, a high-frequency shelf is conveyed to a position close to the workbench, and a low-frequency shelf is conveyed to a storage position distant from the workbench. This reduces the time required for the conveyance of the high-frequency shelves and thus improves the conveyance efficiency.

It will be understood by those of ordinary skills in the art that all or some of the steps in the methods described above may be accomplished by hardware, may also be accomplished by a program to instruct the associated hardware. Said program may be stored in a computer-readable storage medium, such as read-only memory, magnetic disk, optical disk, and the like.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in correlated ways, same or similar parts in each of the embodiments can be referred to one another, and the parts emphasized are differences to other embodiments.

All of the embodiments in the description are described in a correlated manner, and identical or similar parts in various embodiments can refer to one another. In addition, the description for each embodiment focuses on the differences from other embodiments. In particular, a brief description is provided with regard to embodiments of the shelf management apparatus shown in FIG. 5 and FIG. 6, the electronic device shown in FIG. 7, the executable program code and the computer readable storage medium, in view of their resemblance with embodiments of the shelf management method shown in FIG. 1-4. Relevant details can be known with reference to the description of the embodiment of the shelf management method shown in FIG. 1-4.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A shelf management method, comprising:
controlling a conveying means to convey a first shelf to a workbench in a warehouse, the first shelf being a shelf in the warehouse;
controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

2. The method of claim 1, wherein, controlling the conveying means to convey the first shelf to a workbench in a warehouse comprises:

receiving an order containing identification information of a stuff to be delivered; and controlling the conveying means to convey a first shelf storing the to-be-delivered stuff corresponding to the identification information to the workbench in the warehouse.

3. The method of claim 1, wherein, the warehouse comprises a high-frequency area and a low-frequency area, and a distance between the high-frequency area and the workbench is less than a distance between the low-frequency area and the workbench;

controlling the conveying means to convey the first shelf to a first storage position in the warehouse comprises:

if there is an unoccupied storage position in the high-frequency area, selecting a storage position closest to the workbench as the first storage position; and controlling the conveying means to convey the first shelf to the first storage position.

4. The method of claim 3, further comprising:

if there is no unoccupied storage position in the high-frequency area, controlling the conveying means to convey a second shelf to a low-frequency storage position in a low-frequency area, the second shelf being a low-frequency shelf or an empty high-frequency shelf in the high-frequency area; and determining the storage position occupied by the second shelf in the high-frequency-area as the first storage position, and controlling the conveying means to convey the first shelf to the first storage position.

5. The method according to claim 1, further comprising:

calculating a number of deliveries for each shelf in the warehouse according to history information that comprises correspondence between identification information of stuffs, delivery time and delivery amounts; and determining a preset number of shelves subject to the highest numbers of deliveries as high-frequency shelves, and determining shelves other than the high-frequency shelves in the warehouse as low-frequency shelves.

6. The method of claim 5, wherein, calculating a number of deliveries for each shelf in the warehouse according to history information comprises:

calculating, according to the history information, an average number of deliveries for each stuff in a day and an average amount for each delivery; and determining a number of deliveries for each shelf in the warehouse, according to correspondence between identification information of stuffs, identification information of shelves and amounts of stuffs, the average number of deliveries for each stuff and the average amount for each delivery.

7. A shelf management apparatus, comprising:

a first controlling module, configured for controlling a conveying means to convey a first shelf to a workbench in a warehouse, the first shelf being a shelf in the warehouse;

a second controlling module, configured for controlling, if the first shelf is one of high-frequency shelves, the conveying means to convey the first shelf to a first storage position in the warehouse, wherein the high-frequency shelves comprise a preset number of shelves subject to the highest numbers of deliveries in the warehouse; and a third controlling module, configured for controlling, if the first shelf is one of low-frequency shelves, the conveying means to convey the first shelf to a second storage position in the warehouse, wherein the low-frequency shelves comprise shelves other than the high-frequency shelves, and a distance between the first storage position and the workbench is less than a distance between the second storage position and the workbench.

8. The apparatus of claim 7, wherein the first controlling module comprises:

a receiving unit, configured for receiving an order containing identification information of a stuff to be delivered; and a first controlling unit, configured for controlling the conveying means to convey, to the workbench in the warehouse, a first shelf storing the to-be-delivered stuff corresponding to the identification information.

9. The apparatus of claim 7, wherein, the warehouse includes a high-frequency area and a low-frequency area, and a distance between the high-frequency area and the workbench is less than a distance between the low-frequency area and the workbench;

the second controlling module comprises:

a selecting unit, configured for selecting, if there is an unoccupied storage position in the high-frequency area, a storage position closest to the workbench as the first storage position; and a second controlling unit, configured for controlling the conveying means to convey the first shelf to the first storage position.

10. The apparatus of claim 9, wherein the second controlling module further comprises:

a third controlling unit, configured for controlling, if there is no unoccupied storage position in the high-frequency area, the conveying means to convey a second shelf to a low-frequency storage position in a low-frequency area, wherein the second shelf is a low-frequency shelf or an empty high-frequency shelf in the high-frequency area; and a fourth controlling unit, configured for determining the storage position occupied by the second shelf in the high-frequency-area as the first storage position, and controlling the conveying means to convey the first shelf to the first storage position.

11. The apparatus according to claim 7, further comprising:

a calculating module, configured for calculating a number of deliveries for each shelf in the warehouse according to history information, wherein the history information comprises correspondence between identification information of stuffs, delivery time and delivery amounts; and a setting module, configured for determining a preset number of the shelves subject to the highest numbers of deliveries as high-frequency shelves, and determining shelves other than the high-frequency shelves in the warehouse as low-frequency shelves.

12. The apparatus of claim 11, wherein the calculating module comprises:
   a calculating unit, configured for calculating, according to the history information, an average number of deliveries for each stuff in a day and an average amount for each delivery; and
   a determining unit, configured for determining a number of deliveries for each shelf in the warehouse, according to correspondence between identification information of stuffs, identification information of shelves and amounts of stuffs, the average number of deliveries for each stuff and the average amount for each delivery.

13. An electronic device, comprising: a processor and a memory, wherein the memory is configured for storing executable program codes which, when executed by the processor, cause the device to perform the shelf management method of claim 1.

14. A non-transitory computer readable storage medium having executable program instructions stored thereon, which, when being executed, perform the shelf management method of any one of claim 1.

* * * * *